INVENTOR.
MELVIN L. CAMPBELL

BY *Robert M. Sperry*

ATTORNEY

United States Patent Office 3,616,555
Patented Nov. 2, 1971

3,616,555
COMPACT ANNUNCIATOR PACKAGE
Melvin L. Campbell, Marion, Iowa, assignor to Collins Radio Company, Dallas, Tex.
Filed Oct. 14, 1969, Ser. No. 866,307
Int. Cl. G09f *11/10*
U.S. Cl. 40—52                                                   7 Claims

ABSTRACT OF THE DISCLOSURE

This invention relates to a compact annunciator package comprising a prism mounted for rotation about its axis and formed with a plurality of information-bearing surfaces coated with fluorescent paint, together with solenoid means coupled to the prism and actuable to position the prism to selectively present a desired one of its information-bearing surfaces for display.

---

Figure 1:
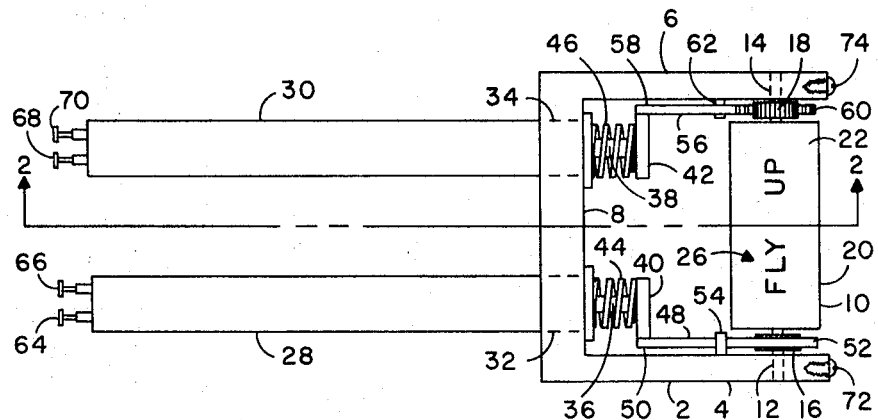

This invention relates to annunciators and is particularly directed to a compact, electro-mechanical annunciator package for use in high-density information display areas, such as aircraft instrument panels.

Modern aircraft are becoming increasingly complex due to continuing development of sophisticated systems for navigation, communication, detection of traffic and weather, and automation. In order for the human pilot to supervise and control these systems, it is necessary to provide display means on the aircraft instrument panel to provide the information for which these systems are intended, together with information for ascertaining whether each of the systems is functioning properly. Furthermore, most of the information which must be displayed involves several alternative conditions. Thus, for example, the altitude deviation portion of many automatic pilot systems requires displays to indicate "non-deviation," "deviation below desired altitude," and "deviation above desired altitude." Unfortunately, the space available for such displays is extremely limited. In addition, the desire to group certain displays together to provide logical presentation of the information further restricts the available space.

Numerous attempts have been made to solve these problems. However, none of the prior art annunciator techniques have been entirely satisfactory. Back-lighted panels have been widely used. However, under high light conditions in the cockpit, such as when the sun is shining on the instrument panel, it becomes extremely difficult to determine which panels are lit. Furthermore, where alternative conditions are involved, a separate lighted panel must be provided for each condition. This compounds the already-critical space problem on the instrument panel.

These advantages of the prior art are overcome with the present invention and an annunciator package is provided which is extremely compact and inexpensive, yet permits display of alternative condition information in the space of a single panel.

The advantages of the present invention are preferably attained by providing a compact annunciator package comprising a prism mounted for rotation about its axis and formed with a plurality of information-bearing surfaces coated with fluorescent paint, together with solenoid means coupled to the prism and actuable to position the prism to selectively present a desired one of its information-bearing surfaces for display.

Accordingly, it is an object of the present invention to provide improved annunciator means.

Another object of the present invention is to provide annunciator means having displays which are easily readable even in direct sunlight.

An additional object of the present invention is to provide annunciator means which permits display of alternative conditions in the space of a single panel.

A further object of the present invention is to provide an annunciator package which is extremely compact and inexpensive.

A specific object of the present invention is to provide an annunciator package comprising a prism mounted for rotation about its axis and formed with a plurality of information-bearing surfaces coated with fluorescent paint, together with solenoid means coupled to the prism and actuable to position the prism to selectively present a desired one of its information-bearing surfaces for display.

These and other objects and features of the present invention will be apparent from the following described detailed description taken with reference to the accompanying drawing.

Figure 2:
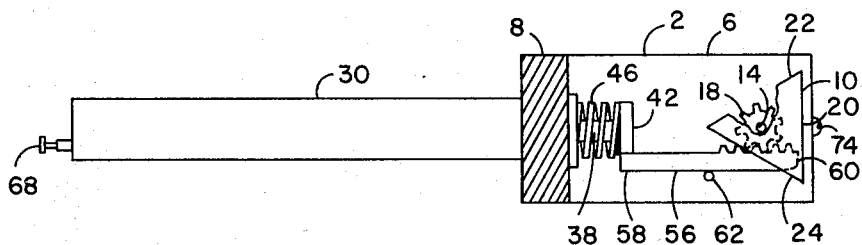

In the drawing:

FIG. 1 is a plan view of an annunciator package embodying the present invention; and FIG. 2 is a transverse section, taken on the line 2—2 of FIG. 1.

In that form of the present invention chosen for purposes of illustration, the annunciator package comprises a generally U-shaped frame 2 having forwardly-extending leg members 4 and 6 joined by a cross-member 8. A multi-sided prism 10 is mounted for rotation about its axis between the leg members 4 and 6 by a pair of pins 12 and 14, each of which has a pinion member fixedly secured thereto, as seen at 16 and 18. The prism 10 is formed with a plurality of information-bearing surfaces 20, 22 and 24, on which appropriate indicia are provided, as indicated at 26. Preferably, the indicia 26 are painted on the surfaces 20, 22, and 24 with fluorescent paint or the like and, if desired, the entire surface 20, 22 or 24 may be painted for purposes of color coding or to attract attention for warning purposes or the like. A pair of solenoids 28 and 30 are mounted in apertures 32 and 34 formed in the cross-member 8 of frame 2. The solenoids 28 and 30 each have armatures 36 and 38 which project forwardly of the cross-member 8 and each carry a respective header member 40 and 42, and are provided with resilient means, such as springs 44 and 46. A first rack member 48 has one end 50 secured to header 40 of armature 36 and has the opposite end 52 held in engagement with the top surface of pinion 16 by suitable means, such as pin 54 carried by leg 4 of the frame 2. Similarly, a second rack member 56 has one end 58 secured to header 42 of armature 38 and has the opposite end 60 held in engagement with the bottom surface of pinion 18 by suitable means, such as pin 62 carried by leg 6 of the frame 2. Solenoids 28 and 30 are provided with suitable terminals 64, 66, 68, and 70 to permit electrical connection to the appropriate instrument. Finally, if desired, the front faces of legs 4 and 6 of frame 2 may be provided with suitable means, such as screws 72 and 74, to facilitate mounting the annunciator package adjacent a suitable opening in the instrument panel.

In operation, the annunciator package is mounted behind the instrument panel in such a manner that surface 20 of prism 10 lies in a vertical plane adjacent the front faces of the legs 4 and 6 of frame 2 and is visible to the pilot through a suitable opening in the instrument panel. Solenoids 28 and 30 are connected by terminals 64, 66, 68 and 70 to appropriate output terminals of a desired instrument.

Thereafter, application of a signal to solenoid 28 will serve to retract armature 36 causing rack 48 and pinion 16 to rotate prism 10 in a first direction, so as to cause surface 24 to be moved into a vertical plane adjacent the front faces of legs 4 and 6 and, hence, be visible to the pilot. Similarly, application of a signal to solenoid 30 will serve to retract armature 38 causing rack 56 and 18 to rotate prism 10 in the opposite direction so as to present surface 22 to the pilot. Springs 44 and 46 serve to bias prism 10 to the "NORMAL" position in which surface 20 is presented to the pilot.

To further illustrate the operation of the annunciator package of the present invention, assume that the device of the present invention is to be used in conjunction with the altitude deviation portion of an automatic pilot system. For this purpose, surface 20 of prism 10 might have the word "ALTITUDE" painted on it and would be visible to the pilot as long as the proper altitude was maintained. Surface 22 of prism 10 might be coated with red fluorescent paint and have the words "FLY UP" painted thereon in black. In this case, solenoid 30 would be connected to receive a signal whenever the auto-pilot sensed a deviation below the desired altitude. In the same manner, surface 24 might bear the words "FLY DOWN" and solenoid 28 would be connected to receive a signal whenever the autopilot sensed a deviation above the desired altitude.

In this way, the annunciator package of the present invention serves to provide three alternative displays while occupying only a single panel position, thereby effecting a significant saving in space on the instrument panel. Moreover, it has been found that panels painted with fluorescent paint are easily readable even in direct sunlight. If desired, more sophisticated displays can be accommodated by appropriate modification of the device of the present invention. Thus, by employing stepped solenoids, graduated springs, and a pentagonal prism; five display surfaces would be available with only a slight increase in size.

In addition, numerous other variations and modifications may, obviously, be made without departing from the present invention. Accordingly, it should be clearly understood that the form of the present invention described above and shown in the accompanying drawing is illustrative only and is not intended to limit the scope of the invention.

What is claimed is:

1. An annunciator package comprising:
   a mounting frame member, a prism mounted for rotation about its axis with respect to said mounting frame member and formed with a plurality of information-bearing surfaces,
   a pair of rack-and-pinion means each interposed between said mounting frame member and said prism and actuable to rotate said prism, and
   a pair of solenoids carried on said mounting frame member each having an armature coupled to a respective one of said rack-and-pinion means and selectably actuable to cause rotation of said prism in a respective direction.

2. The apparatus of claim 1 further comprising:
   resilient means urging the armatures of said solenoids to a neutral position.

3. The apparatus of claim 1, wherein:
   said prism is a triangular prism having one information-bearing surface thereof lying in a viewing plane when said prism is in a neutral position, and
   each of said solenoids is actuable to rotate said prism to a position where a respective one of the remaining information-bearing surfaces of said prism is located in said viewing plane.

4. An annunciator package comprising:
   a generally U-shaped frame member having a pair of forwardly-extending leg portions joined by a cross-member,
   a prism mounted for rotation about its axis between said leg portions and formed with a plurality of information-bearing surfaces,
   a pair of rack-and-pinion means each interposed between a respective one of said leg portions and the adjacent end of said prism and actuable to rotate said prism,
   a pair of solenoids carried by said cross-member each having an armature coupled to a respective one of said rack-and-pinion means and selectably actuable to cause rotation of said prism in a respective direction.

5. The apparatus of claim 4, further comprising:
   resilient means urging the armatures of said solenoids to a neutral position.

6. The apparatus of claim 4, wherein:
   said prism is a triangular prism having one information bearing surface thereof lying in a vertical plane adjacent the forward ends of said leg portions when said prism is in a neutral position, and
   each of said solenoids is actuable to rotate said prism to a position wherein a respective one of the remaining information-bearing surfaces of said prism is located in a vertical plane adjacent the forward ends of said leg portions.

7. The apparatus of claim 4, further comprising:
   indicia painted with fluorescent paint carried by each of said information-bearing surfaces of said prism.

References Cited

UNITED STATES PATENTS

| | | | |
|---|---|---|---|
| 994,992 | 6/1911 | Fisher | 40—77.8 X |
| 1,298,871 | 4/1919 | Bobroff | 40—52 |
| 1,308,658 | 7/1919 | Carr | 40—52 |
| 2,588,183 | 3/1952 | Vigon | 40—134 |
| 3,250,031 | 5/1966 | Bowman | 40—52 X |

FOREIGN PATENTS

| | | |
|---|---|---|
| 39,833 | 11/1909 | Austria. |
| 200,514 | 4/1924 | Great Britain. |
| 19,811 | 3/1909 | Norway. |

ROBERT W. MICHELL, Primary Examiner

R. CARTER, Assistant Examiner

U.S. Cl. X.R.

40—77.8